UNITED STATES PATENT OFFICE.

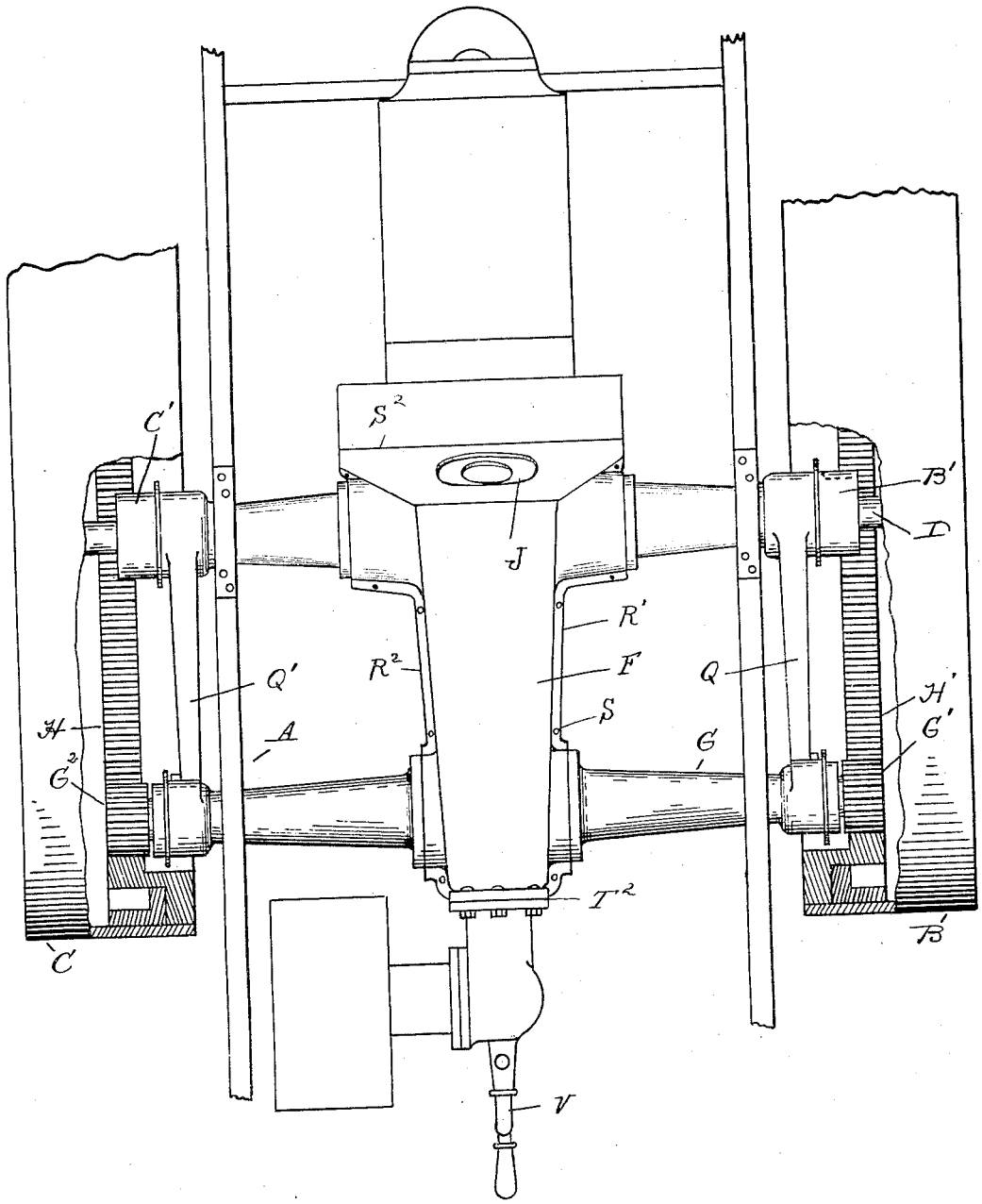

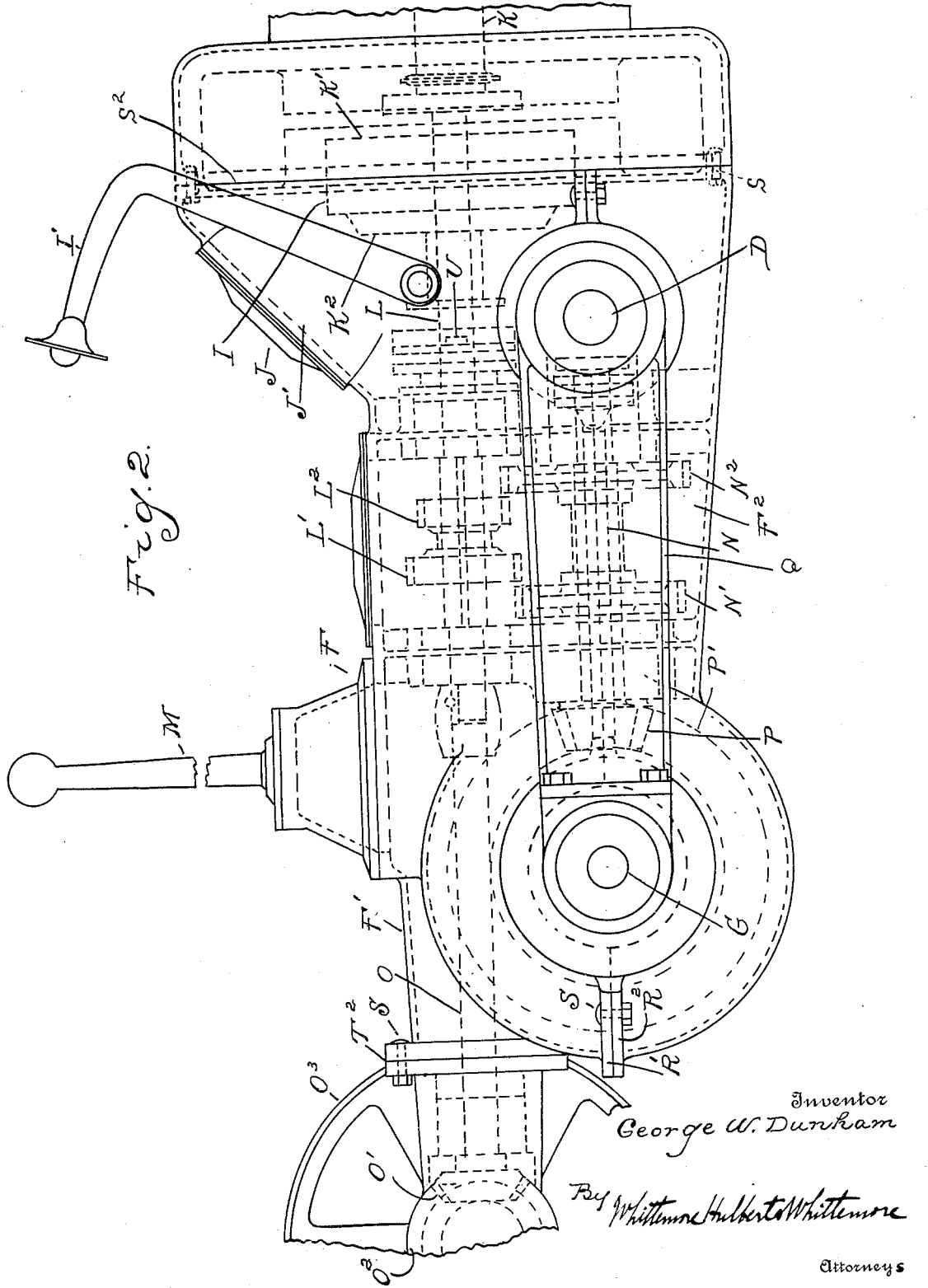

GEORGE W. DUNHAM, OF DETROIT, MICHIGAN, ASSIGNOR TO GRAHAM BROTHERS, OF EVANSVILLE, INDIANA, A CORPORATION OF INDIANA.

UNIT CONSTRUCTION FOR TRACTORS.

1,417,720.

Specification of Letters Patent. Patented May 30, 1922.

Application filed March 8, 1916. Serial No. 82,995.

*To all whom it may concern:*

Be it known that I, GEORGE W. DUNHAM, a citizen of the United States of America, residing at Detroit, in the county of Wayne and State of Michigan, have invented certain new and useful Improvements in Unit Constructions for Tractors, of which the following is a specification, reference being had therein to the accompanying drawings.

This invention relates to an improved unit construction in which the power plant and transmission are contained within a housing that is supported as a unit, and refers more particularly to a construction adapted for use with tractors, trucks, or other heavy vehicles.

Among the objects of the invention are to provide a construction in which the engine, clutch, transmission, jack-shaft, and other working parts are all supported in the same housing; to so construct and arrange the housing that upon removal of its upper half or top portion all the working parts will be readily accessible for repair or renewal; to provide a construction in which a direct drive can also be obtained to the auxiliary power or belt wheel, the latter and a portion of the main transmission being preferably removable with the upper half of the housing; to provide a construction in which the amount of time necessary to remove the housing and get out any of the parts is reduced to a minimum, the construction being preferably such that the removal of a few bolts is all that is necessary to permit the upper half of the housing and a part of the transmission being removed; to provide a construction in which a three point suspension can be employed; and in general to provide a new and improved unit construction for tractors or other heavy vehicles.

The invention further resides in such features of construction and arrangements and combinations of parts as will more fully hereinafter appear.

In the drawings:

Figure 1 is a top plan view of a tractor construction embodying my invention.

Figure 2 is a side-elevational view with certain parts omitted and certain of the interior parts shown in dotted lines.

In the manufacture of tractors, trucks or other self-propelled vehicles easy access to the working parts for adjustment, repair or renewal is of great importance. The present invention contemplates a unitary housing for the engine, clutch, transmission and jack-shaft, so arranged that upon unbolting and removing the upper half of the housing all of the interior parts will be exposed in convenient position.

In detail A designates the tractor frame and B and C the drive wheels supporting the rear end thereof. In the particular construction shown, the wheels B and C are carried on the ends of the axle D which is supported in bearings in the ends B' and C' of the casing. The axle D is keyed or pinned to the wheel B but the wheel C is free to revolve on the axle thus providing the differential action necessary in turning the corner.

Power from the engine is transmitted to the drive wheels B and C through a variable speed gearing, contained within the unit housing F, and a jack-shaft G also contained within the housing and provided at its ends with spur gears G' and G² which mesh with the internal gears H and H' formed in the wheels B and C. It will be noticed that in the present construction the jack-shaft is positioned in the rear of the axle D, the purpose of this construction being to get the weight back sufficiently, while this location of the shaft D also permits the convenient use of a straight axle to support the wheels.

In addition to the transmission and jackshaft the housing F also contains the clutch I which is operated by the clutch pedal I' extending upward through the housing. The usual cap plate J is removably secured over the hand hole J' through which access can be obtained to the clutch parts without removing the upper half of the casing.

In detail the elements contained within the housing comprise the engine, the shaft K of which is provided with a clutch member K' co-operating with the clutch member K² on the shaft L which shaft is in alignment with the engine shaft K. This shaft is longitudinally adjustable upon operation of the gear shifting lever M in the usual manner and has keyed thereto gears L' and L² adapted to mesh with the gears N' and N² carried by the shaft N. Thus upon longitudinal adjustment of the shaft L toward the rear the drive will be through the gears L' and N' to the shaft N while upon forward adjustment of the shaft L the drive will be through the gears L² and N². In Figure 2 the gears are shown in neutral position.

At its rear end the shaft L is splined to a shaft O which has a beveled gear O' engaging a gear O² so as to drive the auxiliary power or belt wheel O³. It will be noticed that when the power is transmitted to the belt wheel O³ it will be by direct drive from the engine shaft, but that the transmission to the jack-shaft is through the parallel shaft N which at its rear end has a pinion P meshing with a large beveled gear P' on the jack-shaft G.

At its forward end the unit housing F is supported so as to give the usual 3-point suspension, while the ends of the jack-shaft are held in alignment by torque arms Q and Q' which are rigidly secured to the axle casing. The horizontal dividing line between the sections F' and F² of the housing is preferably located substantially in the plane of the axes of the jack-shaft G and axle D. This permits ready access to these shafts when the upper section F' is lifted off. The meeting edges of the sections are provided with flanges R' and R² through which suitable bolts S extend. To facilitate the assembly the upper section F' is divided vertically on the line S², the meeting edges on this line being also flanged and secured together by bolts S. Also near the rear end, section T' is divided on the line T², and secured by bolts S in a like manner.

Whenever it is necessary to repair or replace any of the interior mechanisms it is only necessary to remove the bolts S and slide back the rear part of the shaft L so as to permit its disengagement at point U. The entire upper half of the housing can then be removed and inasmuch as the shafts L and O are supported in bearings in the upper section F' these parts will be removed with the upper section. The operator then has all parts of the various shafts, transmission and clutch parts exposed in position to be gotten at easily. Therefore a repair or renewal can be made in a very short time compared to that necessary to make a corresponding repair or renewal in tractors as usually constructed.

At the rear end the unit construction is provided with a suitable starting crank V which can be connected to turn the engine shaft through the shafts O and L as the latter are in alignment with the engine shaft K. The invention, however, is not limited to the details of construction except as set forth in the appended claims.

What I claim as my invention is:

1. The combination of an engine, a jack-shaft and a transmission there-between including parallel gear shafts, and a two part housing supporting said engine, jack-shaft and transmission, one part of said housing being removable and one of said shafts being removable therewith.

2. The combination with an engine, a jack-shaft and a transmission there-between including parallel gear shafts, of a housing for said parts comprising an upper and lower section, each of which carries one of said gear shafts.

3. The combination with an engine, a jack-shaft and a transmission there-between including parallel gear shafts, of a housing for said parts comprising an upper and lower section, each of which carries one of said gear shafts, the meeting edges of said sections lying in the plane of said jack-shaft.

4. The combination of an engine, a jack-shaft, and transmission there-between including parallel gear shafts and an auxiliary drive shaft splined to one of said gear shafts, and a two part housing supporting said shaft, one of said gear shafts and said auxiliary shaft being removable with one part of said housing.

5. The combination of an engine and jack-shaft and a transmission there-between including parallel gear shafts, a two-part housing supporting said engine, jack-shaft and transmission and a supporting axle shaft extending through said housing and located forward of said jack-shaft.

6. The combination with an engine, a transverse jack-shaft and a transmission therebetween, of a supporting shaft and a unit housing construction for said engine, transmission and shafts, said housing being dividable in substantially the plane of the axes of said shafts and having the removable part carrying part of said transmission.

7. The combination with an engine and a jack shaft, of a transmission therebetween, a housing supporting said engine, jack-shaft and transmission, and a supporting axle shaft extending through said housing forward of said jack-shaft.

In testimony whereof I affix my signature in the presence of two witnesses.

GEORGE W. DUNHAM.

Witnesses:
J. F. LOOP,
C. E. GREGORY.